Figure 1:
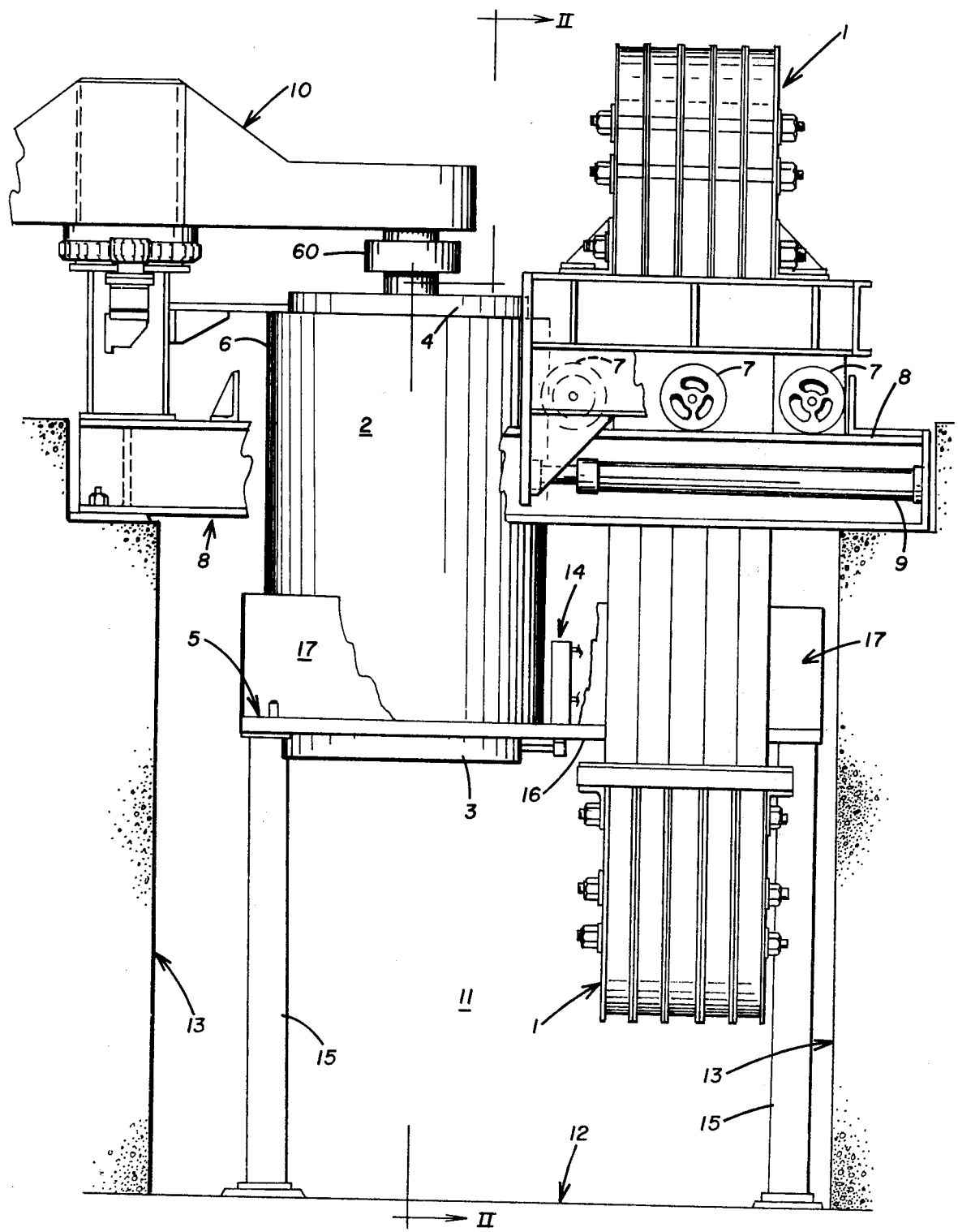

United States Patent [19]

Lipiec et al.

[11] 4,155,476

[45] May 22, 1979

[54] HANGING REACTION FRAME ASSEMBLY

[75] Inventors: Paul J. Lipiec, Maple Shade, N.J.; Joseph W. Wieger, Philadelphia; Charles W. Smith, Jr., Fairview; Francis V. Marchal, Erie, all of Pa.

[73] Assignee: Autoclave Engineers, Inc., Erie, Pa.

[21] Appl. No.: 862,729

[22] Filed: Dec. 21, 1977

[51] Int. Cl.² .................. B30B 11/00; B65D 43/26; B65G 41/01

[52] U.S. Cl. .................. 220/3; 100/214; 105/163 R; 105/367; 220/18; 220/211; 220/256; 220/262; 220/345; 425/77; 425/405 H

[58] Field of Search .............. 100/214; 220/3,256, 220/345, 18, 211, 262; 425/77, 405 H; 23/277 R, 288 M, 285; 49/404, 379, 41; 52/223 R, 224, 227, 228, 20, 66; 176/79, 87; 105/367, 163

[56] References Cited

U.S. PATENT DOCUMENTS

| | | | |
|---|---|---|---|
| 2,229,908 | 1/1941 | Wenneborg | 52/66 |
| 2,580,700 | 1/1952 | Phillips | 220/345 X |
| 2,603,171 | 7/1952 | Smith | 52/66 |
| 3,064,558 | 11/1962 | Von Platen | 100/214 |
| 3,069,731 | 12/1962 | Gibson | 52/66 X |
| 3,278,993 | 10/1966 | Brayman et al. | 425/77 |
| 3,386,206 | 6/1968 | Loveless | 220/345 X |
| 3,550,199 | 12/1970 | Landa | 425/77 |
| 3,605,337 | 9/1971 | Rodgers | 49/41 |
| 3,650,657 | 3/1972 | Watkin | 425/77 X |
| 3,687,066 | 8/1972 | Von Platen et al. | 100/214 |
| 3,783,775 | 1/1974 | Von Platen et al. | 100/214 |
| 3,933,418 | 1/1976 | Elmgren | 425/405 H |
| 3,977,134 | 8/1976 | Gogaert | 49/379 X |

Primary Examiner—Allan N. Shoap
Attorney, Agent, or Firm—Webb, Burden, Robinson & Webb

[57] ABSTRACT

A hanging reaction frame assembly for moving a reaction frame to and from a pressure vessel. The reaction frame is hung from a carriage that moves on tracks spanning a well. The pressure vessel is supported by a scaffold within the well and has a platform that passes through the reaction frame.

5 Claims, 4 Drawing Figures

HANGING REACTION FRAME ASSEMBLY

High pressure vessels of generally cylindrical configuration with axial end pieces or covers are known in the art. Typically, the vessels are loaded and emptied by removing the covers. During pressurization a reaction frame, or press stand as it is sometimes called, restrains the movement of the covers in the axial direction. Since the pressure vessel and reaction frame cannot be axially aligned during loading and unloading, means must be provided for their relative movement. This invention is directed to a unique assembly for moving a reaction frame into and out of alignment with the pressure vessel. The overall configuration enables the movement of a nonrigid reaction frame into and out of alignment with the pressure vessel. Further, it facilitates modular construction techniques for the reaction frame.

This invention relates to a reaction frame of the type described in Cornish et al. U.S. Pat. No. 3,476,281 and more particularly applicants's invention relates to a means of supporting a reaction frame and bringing it into axial alignment with a pressure vessel. Prior devices for moving a rigid press stand relative to a pressure vessel are exemplified in Londa U.S. Pat. No. 3,550,199.

Briefly according to this invention, a carriage guided by horizontal tracks supports a reaction frame hanging therefrom. The reaction frame comprises upper and lower semi-circular end pieces and a plurality of bands each wrapped around the said end pieces. The end pieces and bands define a generally rectangular inner space. A horizontal scaffold is placed in a well between the tracks and passes through the rectangular inner space in the reaction frame. A pressure vessel is supported from the scaffold with end pieces exposed. The movement of the carriage on the horizontal track carries the reaction frame over the pressure vessel in a position to secure the ends thereof or carries the reaction frame clear of the pressure vessel.

Figure 2:
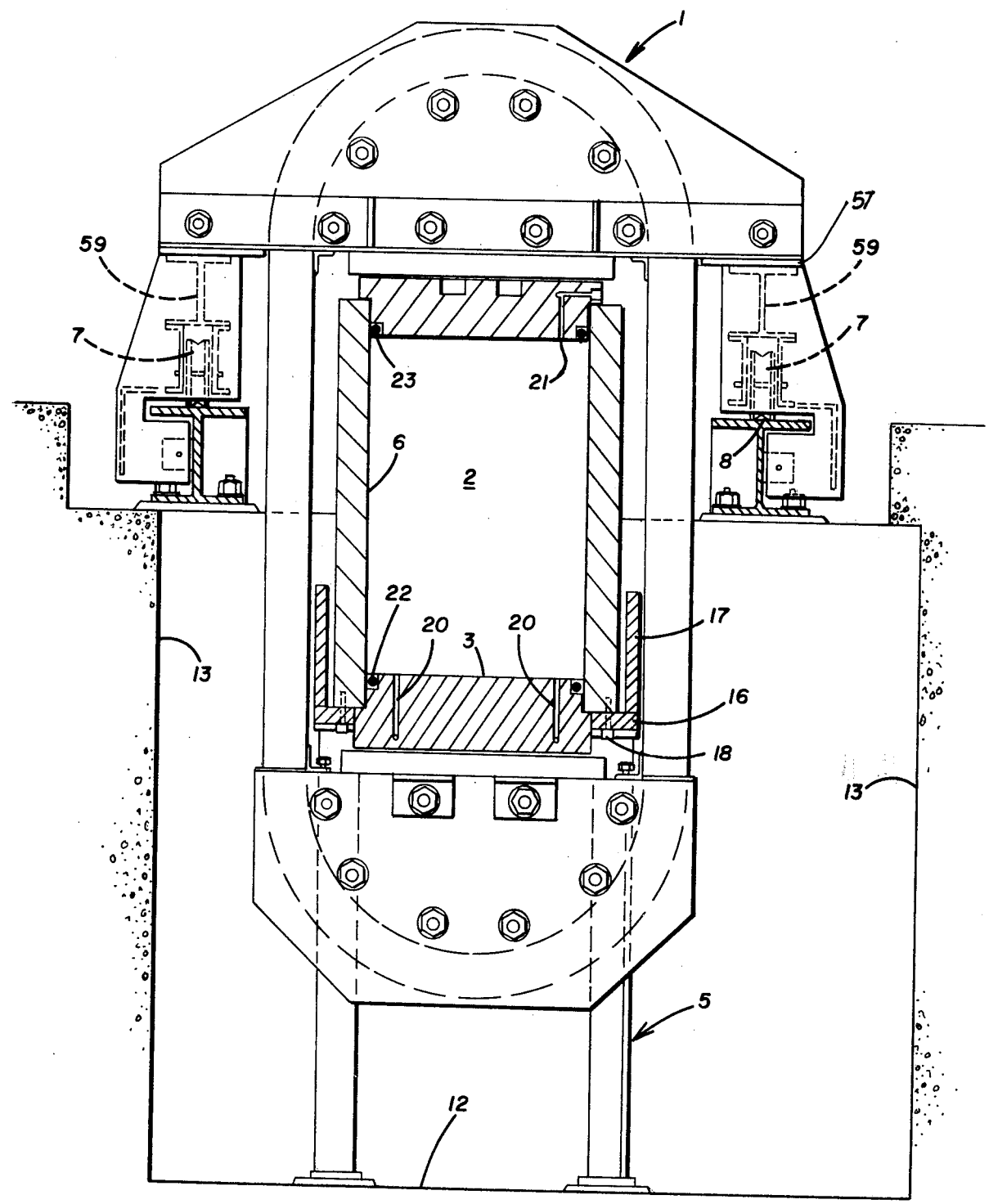
Figures 3, 4:
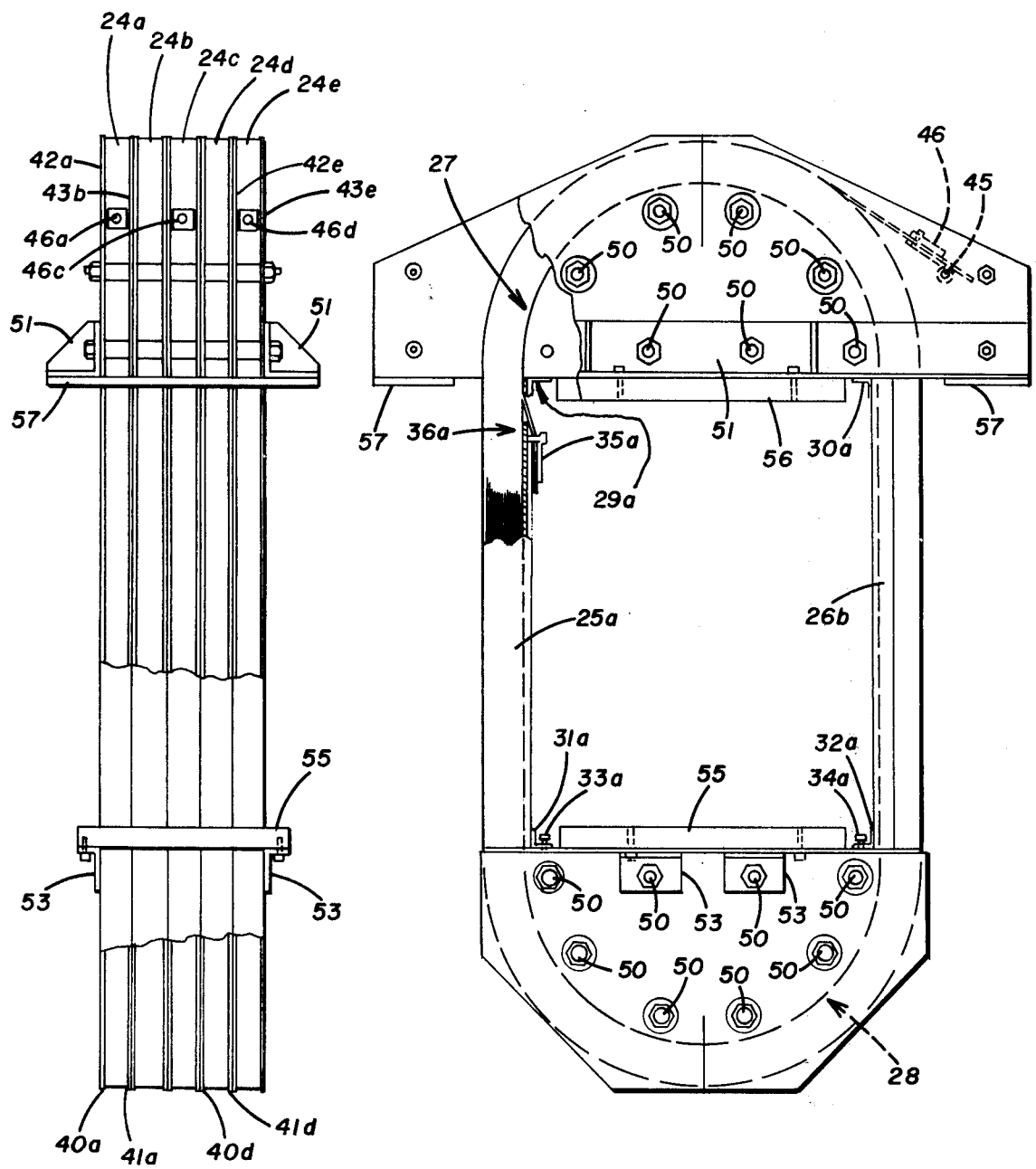

Further features and other objects and advantages of this invention will become clear from the following detailed description made with reference to the drawings, in which FIG. 1 is a side view of the hanging reaction frame assembly, FIG. 2 is a partial section of the hanging reaction frame assembly taken along lines II—II of FIG. 1, FIG. 3 is a side view of the reaction frame itself, and FIG. 4 is a front view of the reaction frame having certain portions broken away.

Referring now to FIG. 1, there is shown a side view of the reaction frame 1 moved away from the reaction vessel 2. The reaction vessel has a cylindrical body 6 shown having a vertically aligned cylindrical axis and two end pieces or covers 3 and 4 which are restrained from movement in the axial direction by the reaction frame when the vessel is pressurized. The vessel is mounted upon a scaffold 5 which holds the vessel in such a manner that the end pieces are exposed and the reaction frame may be slid into contact with the end pieces prior to pressurization.

The reaction frame is hung upon a carriage, as will be explained, which has wheels 7 guided over a pair of tracks 8 shown spaced to each side of the vessel. A hydraulic cylinder and piston 9 provide for moving the carriage and frame to and from the working position. A movable overhead crane 10 is arranged to swing over the cover 4 so it can be removed for loading or unloading. The lower end piece 3 is held in place (when the reaction frame is removed) by pistons and cylinders 14 (only one shown in the drawing). In this way, the lower cover can be lowered away from the cylindrical portion of the vessel as desired. The cylinder is secured to the scaffold 5 and the piston to the lower cover 3. Preferably four cylinders and pistons are provided spaced around the vessel in a way not to interfere with the travel of the reaction frame 1.

According to the preferred embodiment illustrated in FIG. 1, the scaffold 5 is set in a well 11 having a bottom 12 and vertical sides 13. The tracks 8 span the well and the reaction frame hangs downwardly into the well. The crane 10 for removing the top cover is positioned just to the side of the top edge of the well.

The scaffold 5 comprises uprights 15 and a platform 16 which threads the reaction frame 1. A skirt 17 boarders the platform 16 and is shown cutaway in FIG. 1 and sectioned in FIG. 2. The scaffold 5 is shown fixed relative to the bottom of the well and the tracks 8 are shown spanning the well. Hence, the scaffold 5 supporting the vessel 2 is fixed relative to the tracks 8.

FIG. 2 is a section view taken along line II—II of FIG. 1. This section is taken so that portions of the reaction vessel 1, the platform 16 and skirt 17 of the scaffold and the tracks 8 are shown sectioned. The cylindrical portion of the vessel is fixed by studs and nuts 18 to the platform 16. The lower cover 3 has passages for introducing pressurizing fluid into the vessel and for emptying the fluid. The upper cover 3 has a passage 21 for permitting the escape of air from the vessel while it is being pressurized. Upper and lower seals 22 and 23 are spaced around a narrowed portion of the end pieces. Pressurization of the vessel expands these seals against the sides of the cylindrical vessel 6 making the vessel pressure tight.

Referring now to FIGS. 3 and 4, the reaction frame itself is illustrated apart from the vessel and track. The reaction frame is actually five frame modules 24a, 24b, 24c, 24d and 24e bolted together. (In the following description the same numeral will be used for identical parts on each frame module. Small letters following the numeral will be used to distinguish the same parts on different modules.) Each frame module comprises two spacers 25 and 26 which may be channels i.e., channel beams and two end pieces 27 and 28 having semicircular and diametral edge faces and a band wrapped thereon. The channel beams are fixed to the diametral edge face of an upper end piece, for example, by welded angles 29a and 30a. A lower end piece is releasably secured to the channel beams, for example, by angles 31a and 32a which are welded to the channel beams and releasably secured by bolts 33a and 34a to a bottom end piece. The bolts 33a and 34a are secured during wrapping and hanging of the frame but must be released prior to loading so that the channel beams do not take up the reaction load. One of the channel beams 25a has a portion of the web (i.e., the stripe connecting the spaced parallel flanges of the channel beam) cut away through which the reaction band is passed. The band is then fixed to the inside edge by a clamping mechanism 35a. In this way, the band is not subjected to kinks where it enters the clamp and where it leaves the end piece. The band is wrapped around the semi-circular edge faces of the end pieces of the frame to form a plurality of wraps 36a.

The end pieces each have spacer plates on each side (large planar face—not the edge) thereof. The lower end pieces have spacer plates 40 and 41 which guide the band as it is being wrapped. They reasonably conform to the size of the lower semi-circular end pieces as their basic function is to guide the band into place during wrapping and to keep the band from sliding off the frame during wrapping and hanging. The upper semi-circular end pieces also have spacer plates 42 and 43. These extend outwardly of the end pieces some distance to enable them to perform two functions in addition to those performed by lower spacer plates; namely, the spacer plates adjacent the upper end pieces secure the frame modules to the carriage and fasten one end of the band wrapped on the frame. A pin 45 is journaled between the spacer plates associated with each upper end piece. Fastened to the pin is a clamp 46. The outermost wrap of the band is held by the clamp 46. As shown in FIG. 4, the closest reaction frame module is wrapped clockwise. Hence, the clamp 35a on the spacer channel beam 25a is at the left and the clamp 46a and pin 45a between the spacer plates 42a and 43a are on the right. It is preferred that alternate reaction frame modules are wrapped differently, one counterclockwise the next clockwise. Thus, adjacent modules may have their respective clamp 46 located either on the left or on the right, as shown in FIG. 4.

The modules are secured together by a plurality of bolts 50 passing through the end pieces. Outside each outer frame are angles 51 and 53 which are held in place by bolts 50 along the diametral edge face of the end pieces. The sole purpose of the angles 53 on the lower end pieces is to secure balancing plate 55 to the lower end piece. The angles 51 on the upper end pieces secure the upper balancing plate 56 and also provide additional strength to the sideways extending portions of the face plates 42a and 43e.

A base plate 57 is secured to the underside of the upper face plates 42 and 43 and the angles 51. The supports 59 for the wheels are secured to the base plates 57. A suitable configuration of the wheel supports is shown in section in FIG. 2. The wheel supports comprise two spaced channels secured to the bottom web of an I-beam. The wheel axles are journaled in the channels. The wheels 7 are notched on the circumferential surface and ride upon a knife edge welded to the upper face of the I-beam track 8 spanning the well.

The crane 10 has a horizontal arm that rotates over the top of the vessel. A recess in the cover 3 near the center thereof is configured to be engaged by a coupler 60 pendent from the horizontal arm.

A substantial benefit results from the modularization of the reaction frame. The reaction frame cannot be designed to be rigid and yet it is a very heavy element. The modularization of the reaction frame enables smaller units to be wrapped and individually hung. Each module can be constructed with a certain temporary inexpensive rigidity. The modules are assembled as follows: The end pieces 27, 28 are secured to the spacing channels 25, 26 and the facing plates 40, 41, 42 and 43 are attached. The thus assembled frame is fixed relative to a circumscribing track. A coiled strip is secured to a reel movable about the circumscribing track. An end of the strip is secured to the inside of one of the channels of the reaction frame and thereafter the coil is moved around the reaction frame on the track while pressing the strip tightly against the frame or the next adjacent wrap of the strip at the point where it is laying onto the frame. After a sufficient number of wraps have been placed on the frame, the strip is cut and fixed to a clamp on the upper end piece. After the modules are wrapped they are individually shipped or stored as the case may be. When an entire reaction frame assembly is put together, the modules are placed one by one upon the carriage, bolted together and to the carriage. Prior to use of the assembled frame, the lower end pieces and spacers must be unbolted.

Having thus defined my invention in the detail and with the particularity required by the Patent Laws, what is desired protection by Letters Patent is set forth in the following claims.

We claim:

1. A reaction frame assembly for restraining movement of the end closure pieces of a cylindrical vessel along the vertically orientated axis of the cylinder, said assembly comprising
   (a) a pair of horizontal track rails, spaced to each side of the vessel
   (b) a carriage having wheels resting on said horizontal tracks guided thereby
   (c) a reaction frame extending between and over said rails comprising upper and lower semi-circular end pieces and a plurality of bands each wrapped around the said end pieces to form a plurality of wraps, the end pieces and bands defining a generally rectangular inner space, said upper end piece being supported by the carriage with the lower piece hanging free by the bands,
   (d) a horizontal stationary platform fixed axially away from the horizontal track rails, said platform sized for passing though said rectangular inner space in said reaction frame, said platform engaging the cylindrical vessel and holding it fixed relative to the said horizontal tracks and in a position such that movement of the carriage on its horizontal tracks carries the generally rectangular inner space of the reaction frame over the platform and pressure vessel in a position to secure the end closure pieces thereof or carries the reaction frame clear of the reaction vessel.

2. A reaction frame assembly according to claim 1 wherein the pressure vessel is mounted on the platform with its upper and lower end closure pieces spaced on either side of the platform.

3. A reaction frame assembly according to claim 1 wherein extensible means mounted to the platform can raise and lower the lower end closure of the pressure vessel.

4. A reaction frame assembly according to claim 1 wherein the reaction frame comprises a plurality of substantially identical modules, each module comprising semi-circular end pieces, spacers and a band wrapped about the end pieces to form a plurality of wraps.

5. A module for combining with a plurality of other identical modules to form a reaction frame, said module comprising upper and lower end pieces, said end pieces having planar sides and having a semi-circular cylindrical edge face and a diametral edge face, said diametral faces of said upper and lower end pieces being generally parallel and confronting across a space, two channel beam spacers between said end pieces perpendicular to the diametral faces, said channel beam spacers and diametral faces enclosing a rectangular space, means securing the channel beams to the upper end piece and means releasably securing the channel beams to the lower end piece, plates abutting each planar side of the upper and lower end pieces and extending radially outward of the semi-circular cylindrical edge faces, said plates and cylindrical edge faces defining guideways, said plates secured to said upper end pieces extending outwardly of the end pieces parallel to the diametral edge face providing cantilevered extensions for securing the frame to a carriage, a single band wrapped about the end pieces in a plurality of overlapping wraps nested with the guideways, the innermost wrap being secured to one of said channel beam spacers, and the outermost wrap of said band being secured to a bar fixed between two of said plates.

* * * * *